(12) United States Patent
Zhang et al.

(10) Patent No.: US 7,834,858 B2
(45) Date of Patent: Nov. 16, 2010

(54) DEPRESSABLE COMPUTER TOUCH INPUT DEVICE FOR ACTIVATING AN ADDITIONAL CONTROL SIGNAL

(75) Inventors: Hui-Zhen Zhang, Taipei (TW); Li-Wen Lin, Taipei (TW)

(73) Assignee: Kye Systems Corp., Taipei (TW)

( * ) Notice: Subject to any disclaimer, the term of this patent is extended or adjusted under 35 U.S.C. 154(b) by 674 days.

(21) Appl. No.: 11/580,950

(22) Filed: Oct. 16, 2006

(65) Prior Publication Data

US 2008/0036733 A1 Feb. 14, 2008

(30) Foreign Application Priority Data

Aug. 9, 2006 (TW) .............................. 95129264 A

(51) Int. Cl.
*G06F 3/041* (2006.01)
(52) U.S. Cl. ..................... 345/173; 345/165; 345/166
(58) Field of Classification Search ......... 345/156–175, 345/179
See application file for complete search history.

(56) References Cited

U.S. PATENT DOCUMENTS

| 5,355,148 | A | * | 10/1994 | Anderson | .................... 345/166 |
| 5,578,817 | A | | 11/1996 | Bidiville et al. | ............. 250/221 |
| 5,623,553 | A | | 4/1997 | Sekiya | ........................ 382/127 |
| 5,801,681 | A | | 9/1998 | Sayag | ......................... 345/157 |
| 6,552,713 | B1 | | 4/2003 | Van Brocklin et al. | ...... 345/157 |
| 6,853,366 | B2 | * | 2/2005 | Bowen | ......................... 345/163 |
| 7,358,963 | B2 | * | 4/2008 | Low et al. | .................... 345/175 |
| 2004/0113886 | A1 | * | 6/2004 | Lee | .............................. 345/156 |
| 2006/0114232 | A1 | * | 6/2006 | Choi | ........................... 345/166 |

\* cited by examiner

*Primary Examiner*—Kimnhung Nguyen
(74) *Attorney, Agent, or Firm*—Bacon & Thomas, PLLC

(57) ABSTRACT

A trace-detecting computer input device such as a touch input device, optical tracing module, or optical tracing plate includes a trace-detecting module and a microswitch. The trace-detecting module has a neutral position and a depressed position. A first control signal is generated when an object moves across the top of the trace-detecting module. When the trace-detecting module is in the depressed position, the microswitch is activated to generate a second control signal which is in addition to the trace-detecting first control signal.

4 Claims, 4 Drawing Sheets

DEPRESSABLE COMPUTER TOUCH INPUT DEVICE FOR ACTIVATING AN ADDITIONAL CONTROL SIGNAL

BACKGROUND OF THE INVENTION

1. Field of the Invention

The present invention relates to a computer touch input device or other trace-detection input device such as an optical tracing plate or module, and in particular to a depressible mechanism for a trace detecting module that generates a control signal. The control signal thus generated is in addition to the trace detecting signal, so that the user can generate both trace-detection signals and control signals by moving a single finger or other object.

2. Description of the Prior Art

In order to replace a conventional mouse, a variety of touch pad devices (computer touch input devices) have been applied to a computer system, such as a notebook computer, for controlling cursor movement or scrolling a window-based application on a display.

U.S. Pat. Nos. 5,578,817, 5,623,553, 5,801,681, and 6,552,713 disclose trace-detecting devices in which, if an object moves across a tracing plate of the trace detecting device, the trace-detecting device will generate a trace-detecting signal to the computer in response to movement of the object relative to the trace detecting device.

However, if the user wishes to execute a program or a hyperlink on the display, the user still has to use other fingers to depress a corresponding button which is provided with conventional mouse control functions. This is a problem because most users use their index finger to control cursor movement and the thumb and middle finger to depress buttons, resulting in unnatural finger exercise that tends to cause fatigue of the user's hand.

SUMMARY OF THE DISCLOSURE

It is an objective of the present invention to provide a depressible mechanism for a trace detecting module of a computer touch input device which enables generation of a control signal in addition to the trace-detection signal.

To accomplish this objective, the invention comprises a microswitch and a trace-detecting module. The trace-detecting module has a neutral position and a depressed position. The trace-detecting module generates a first control signal while an object moves across a top of the trace-detecting module without depressing the module, and the microswitch generates a second control signal when the trace-detecting module is depressed.

DETAILED DESCRIPTION OF THE PREFERRED EMBODIMENTS

Figure 1:
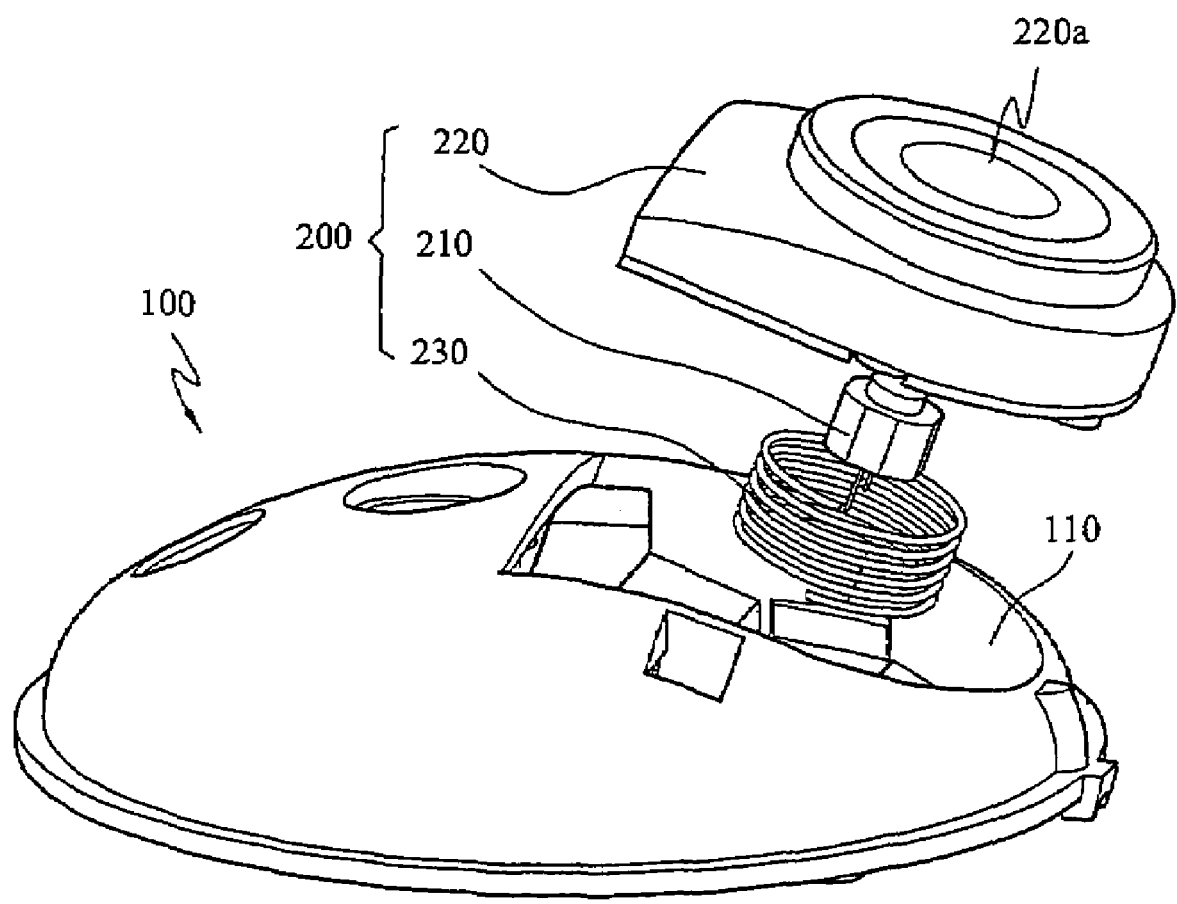
FIG. 1 is an exploded perspective view of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention can be applied to any computer system, including but not limited to desk-top or notebook computers, as well as any other device that can utilize a touch input or trace-detecting module, such as household appliances, personal digital assistants (PDAs), cell phones, and so forth. The trace-detecting module of the present invention includes but is not to be limited to a touch pad (which either detects a change in electrical capacitance, resistance, or the like), an optical tracing module, or an optical tracing plate. The trace-detecting signal generated by the trace-detecting module may control the movement of a cursor, the scrolling in a window-based application, or other display element movements. The control signal generated by a microswitch according to the invention may execute a program, hyperlink, or any other display or input function capable of being controlled by a control signal.

As illustrated in FIGS. 1-5, a depressible computer touch input device according to a preferred embodiment of the invention includes a body 100 and a trace-detecting device 200. The trace-detecting device 200 further has a trace-detecting module 220, a microswitch 210, and a resilient element 230 which are all received within the cavity 110 of the body 100. If the trace-detecting module 220 is an optical one, then it further has an optical-tracing module, a housing 221, a light-pervious element 222, a light source 223, and a light sensor 224. The housing 221 has a space 221a for accommodating the light source 223 and the light sensor 224, and an opening 221b for receiving the light-pervious element 222. The light-pervious element can be a transparent or a translucent plate, a transparent or a translucent curved plate, a convex lens, or a concave lens, or any other light pervious element.

Figure 2:
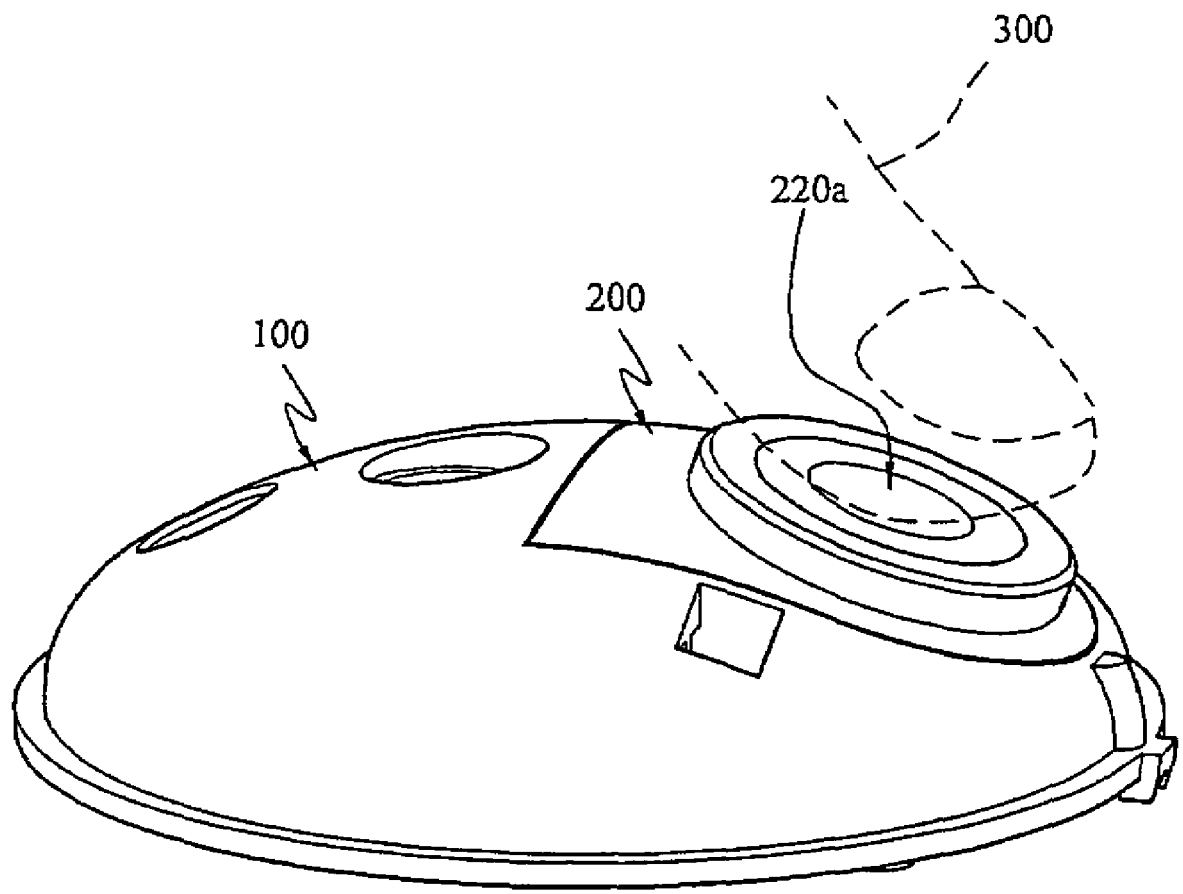
FIG. 2 is a perspective view of the present invention.
Figure 3:
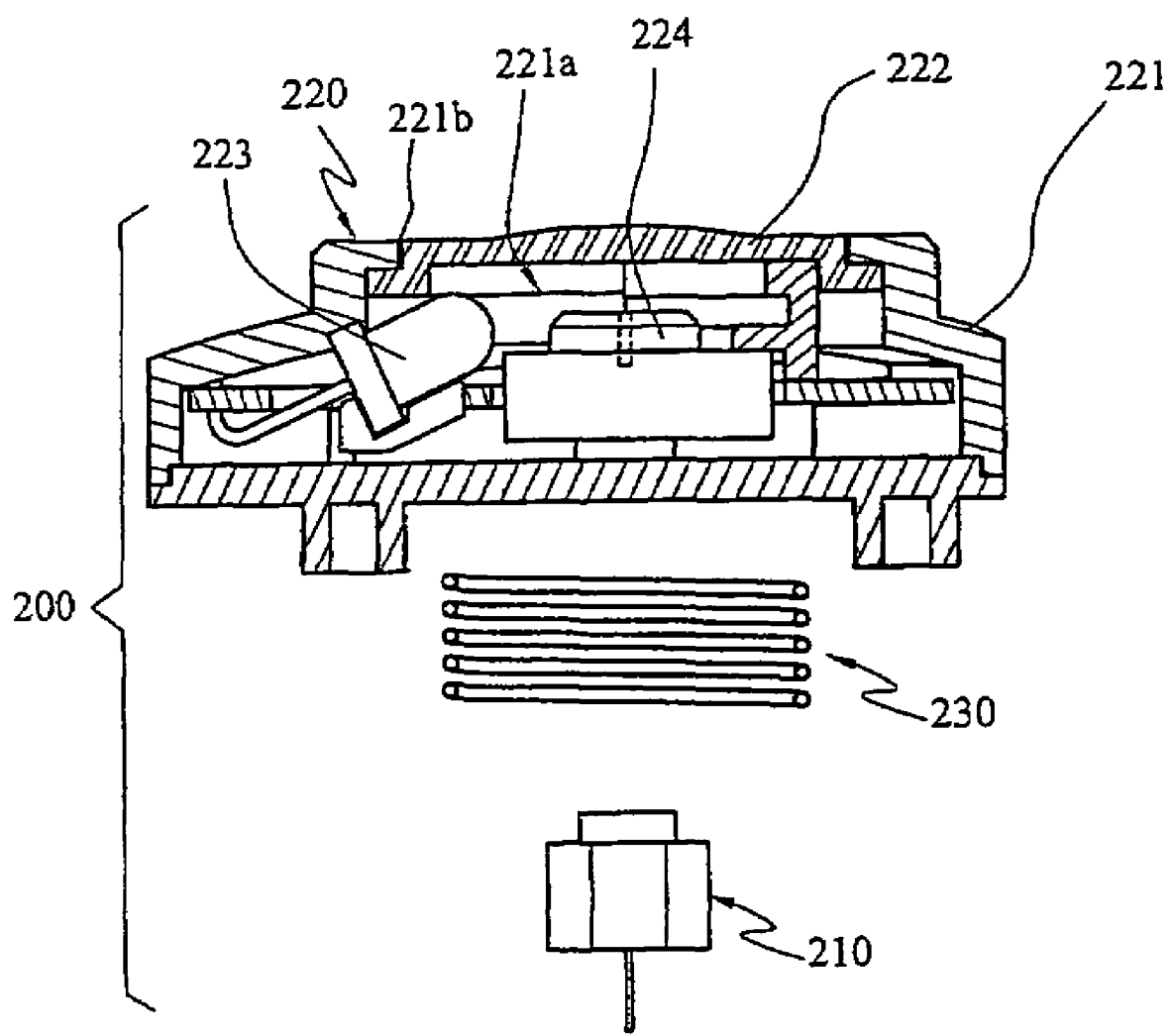
FIG. 3 is a sectional view of a trace-detecting device according to the present invention.
Figure 4:
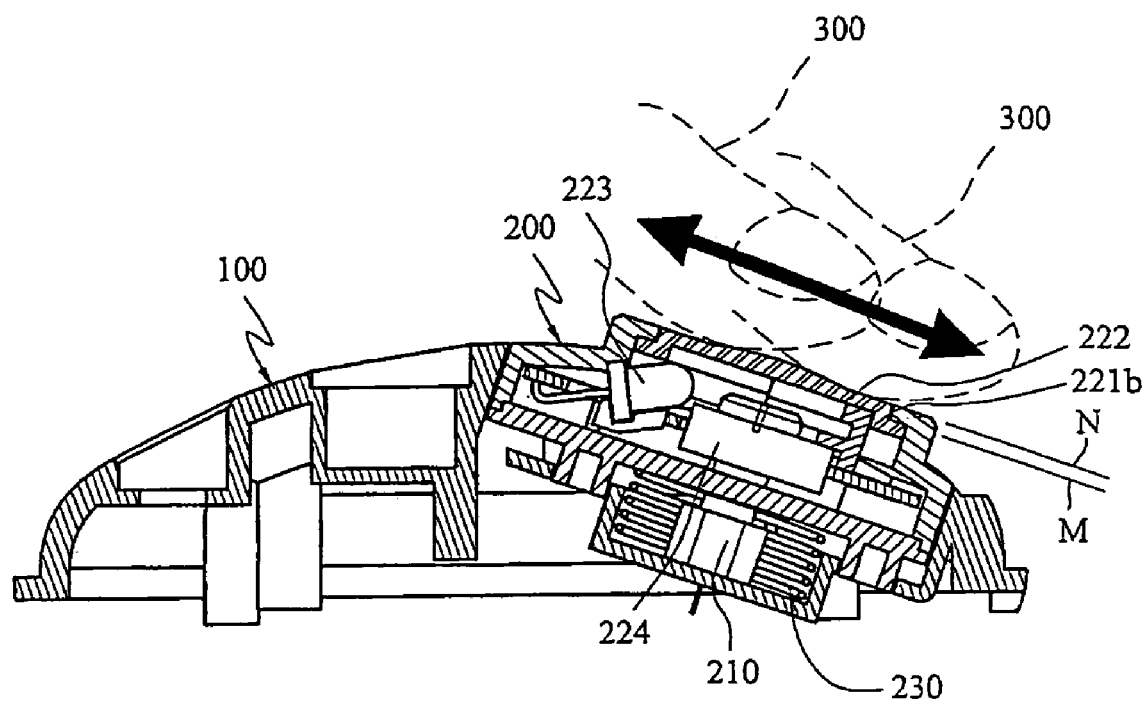
FIG. 4 is a sectional view of the trace-detecting device at a neutral position N.

The light source 223 can be a laser diode or a light emitting diode (LED), and the light source 223 always projects a light beam to the light-pervious element 222. Referring to FIGS. 2 and 4, when an object, for example a finger 300, is placed on the light-pervious element 222 of the trace-detecting module 220, the light sensor 224 will detect a reflected image of the finger 300. Moreover, when the finger 300 moves across the light-pervious element 222 of the trace-detecting module 220, the light sensor 224 will keep detecting the movement of the finger 300. In the meantime, a micro control unit (not shown) within the body 100 will calculate the direction, speed, and/or the amount of the finger movement on the light-pervious element 222, and generate a trace-detecting signal for transmission to a computer (not shown) in response to the finger movement. Therefore, the trace-detecting signal can control a cursor movement on a display, or scroll the content on the display in a window-based application.

Figure 5:
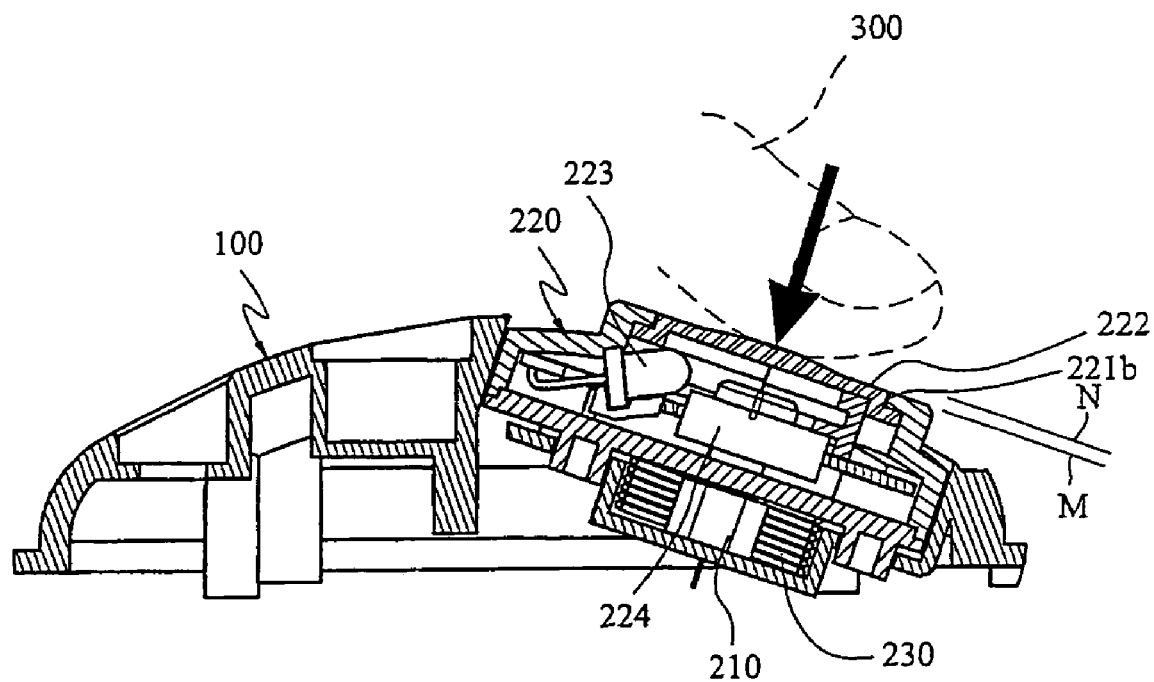
FIG. 5 is a sectional view of the trace-detecting device at a depressed position M.

Referring to FIGS. 4 and 5, the resilient element 230 biases the housing 221 of the trace-detecting module 220 towards a neutral position N, in which the microswitch 210 is adjacent to but not depressed by the trace-detecting module 220. When the trace-detecting module 220 is forced against the bias provided by resilient element 230 to move from a neutral position N to a depressed position M, the housing 221 pushes on and depresses microswitch 210. Therefore, the user not only can move his finger 300 to control the cursor movement to a desired position on the display, but the user can also depress the trace-detecting module 220 from the neutral position N to the depressed position M such that housing 221 will contact the microswitch 210 and the microswitch 210 will be activated so as to generate a control signal, which may be used to execute a program, hyperlink, or the like.

When the user releases the depressing force applied to his finger 300 on the trace-detecting module 220, the restoring force generated by the resilient element 230 will push the trace-detecting module 220 back to the neutral position N.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A computer input device comprising:
   a body including a cavity;
   a trace-detecting module slidably positioned in said cavity such that trace-detecting module is movable relative to the body from a neutral position to a depressed position against a bias provided by a resilient element that is connected to the trace-detecting module, the trace-detecting module including a light pervious element, a light source, and a light sensor that are fixed within said trace-detecting module and movable with the trace-detecting element relative to the body and a microswitch;
   wherein the trace-detecting module generates a first control signal upon detecting movement of a user's finger across the light pervious element,
   wherein the trace-detecting module is arranged to be moved by the user's finger from said neutral position to said depressed position, the light pervious element, light source, and light sensor all being depressed with the trace-detecting module, the microswitch generating a second control signal when the trace-detecting module is moved to said depressed position.

2. The trace-detecting input device as claimed in claim 1, wherein the trace-detecting input device is a touch input device.

3. A computer input device, comprising:
   a body including a cavity;
   a microswitch; and
   a trace-detecting module movably mounted in said cavity, a top of the trace-detecting module having a light-pervious element, which is positioned opposite to a light source and a light sensor that are fixed in said trace-detecting module and movable with the trace-detecting module relative to the body and the microswitch;
   wherein the trace-detecting module has a neutral position and a depressed position to which the trace-detecting module, together with the light-pervious element, light source, and light sensor, is moved by a user's finger;
   wherein the trace-detecting module generates a first control signal while the user's finger is moving across a top of the trace-detecting module; and
   wherein the microswitch generates a second control signal while the trace-detecting module is at the depressed position.

4. A computer input device with a depressible trace-detecting module, comprising:
   a body including a cavity;
   a microswitch; and
   a trace-detecting module movably mounted in said cavity, a top of the trace-detecting module having a light-pervious element, which is positioned opposite to a light source and a light sensor that are fixed in said trace-detecting module and movable with the trace-detecting module relative to the body and the microswitch;
   a resilient element for biasing the trace-detecting module to a neutral position;
   wherein the trace-detecting module has a depressed position in addition to the neutral position, said trace-detecting module being moved, together with the light pervious element, light source, and light sensor, by a user's finger from the neutral position to the depressed position;
   wherein the trace-detecting module generates a first control signal while the user's finger is moving across a top of the trace-detecting module; and
   wherein the microswitch generates a second control signal while the trace-detecting module is at the depressed position; and the resilient element restores the trace-detecting module to the neutral position.

* * * * *